United States Patent [19]

Smith

[11] Patent Number: 5,074,419

[45] Date of Patent: Dec. 24, 1991

[54] CEILING OR WALL MOUNTED STORAGE HANGER

[76] Inventor: Clive G. Smith, 369 Hill St., San Francisco, Calif. 94114

[21] Appl. No.: 558,217

[22] Filed: Jul. 26, 1990

[51] Int. Cl.$^5$ ............................................. A47F 7/00
[52] U.S. Cl. ...................................... 211/17; 248/215
[58] Field of Search .................. 211/17, 18, 113, 115, 211/119; 248/308, 215, 340, 339, 227, 301, 303

[56] References Cited

U.S. PATENT DOCUMENTS

| | | | |
|---|---|---|---|
| 618,999 | 2/1899 | Sayer | 211/17 |
| 895,047 | 8/1908 | Schraudner | 248/215 X |
| 2,470,878 | 5/1949 | Tate | 248/215 X |
| 3,043,546 | 7/1962 | Reich | 248/215 |
| 3,612,459 | 10/1971 | Walls | 248/215 |
| 3,782,559 | 1/1974 | Wright | 211/17 |
| 4,700,845 | 10/1987 | Fretter | 211/18 |
| 4,718,562 | 1/1988 | Winkler | 211/94.5 |
| 4,821,890 | 4/1989 | Hills | 211/18 |
| 4,840,278 | 6/1989 | Gelinas | 211/18 |

FOREIGN PATENT DOCUMENTS 16995  5/1898  Switzerland ........................ 211/18

Primary Examiner—J. Franklin Foss

[57] ABSTRACT

Disclosed is an economic easily mounted storage hanger, well suited to the storage of bicycles and ladders.

The invention comprises an substantially arcuate load restraining means whose ends are fashioned into load restraining members, whereby the burden of a load is spread horizontally across said load restraining members. A bipedal clamping means whereby the arcuate load restraining means may be mounted to an exposed ceiling joist. A flush surface mounting means to which the said clamping means may be secured.

The load restraining means is variously attachable to the clamping means, whereby in either ceiling or wall mounting the load restraining means may be usefully oriented.

4 Claims, 2 Drawing Sheets

CEILING OR WALL MOUNTED STORAGE HANGER

FIELD OF THE INVENTION

This invention relates to the hanging up of items in storage. Particularly to the storage of bicycles and ladders.

DISCUSSION OF PRIOR ART

Heretofore, options for those wishing to hang such items as bicycles and ladders in storage, in a manner appropriate to the home environment, have been limited.

Devising useful placement of single hanging devices, and combinations thereof, together with rope, stretch cords and the like, has been the necessarily time consuming, often frustrating and inefficient approach.

Hanging a ladder on a wall consumes a lot of useful space, it is better hung in a flat relationship to unused ceiling space.

Bicycles are typically hung by one wheel rim on one hook. A system requiring the awkward maneouvre of holding the bicycle in the vertical, wheel over wheel position, stopping the upper wheel rotating, and locating its rim upon the hook.

Devices known in the art, do not have the versatility of being ceiling or wall mountable, easily installed, and economic of manufacture.

OBJECTS AND ADVANTAGES

Accordingly, objects and advantages of this invention include the following.

Basements and garages, where bicycles and ladders are most commonly stored, very often have exposed ceiling joists.

Where there is an exposed ceiling joist, this invention installs very easily.

In the case of a covered ceiling or wall, installation is very easily achieved by using the flush surface mounting means.

Where this invention is ceiling mounted, its versatility is further enhanced by the ability of the load restraining means to be rotated in the horizantal plane. Thus it may be in a parallel or perpendicular relationship to the length of the joist.

In the case of bicycle storage, the bicycle is suspended in its normal, upright position, where it may be conveniently worked upon by a standing person.

In the case of ladder storage, one of this invention for each end of the ladder, permits its storage in a flat relationship to the ceiling. Thus utilizing ceiling space, and sparing valuable wall space.

Being ceiling or wall mountable, and appropriate to the storage of many items, this invention combines versatility with economy of manufacture and mechanical integrity.

Further objects and advantages of this invention will become apparent from a consideration of the drawings and ensuing description.

LIST OF REFERENCE NUMERALS

Figure 1:
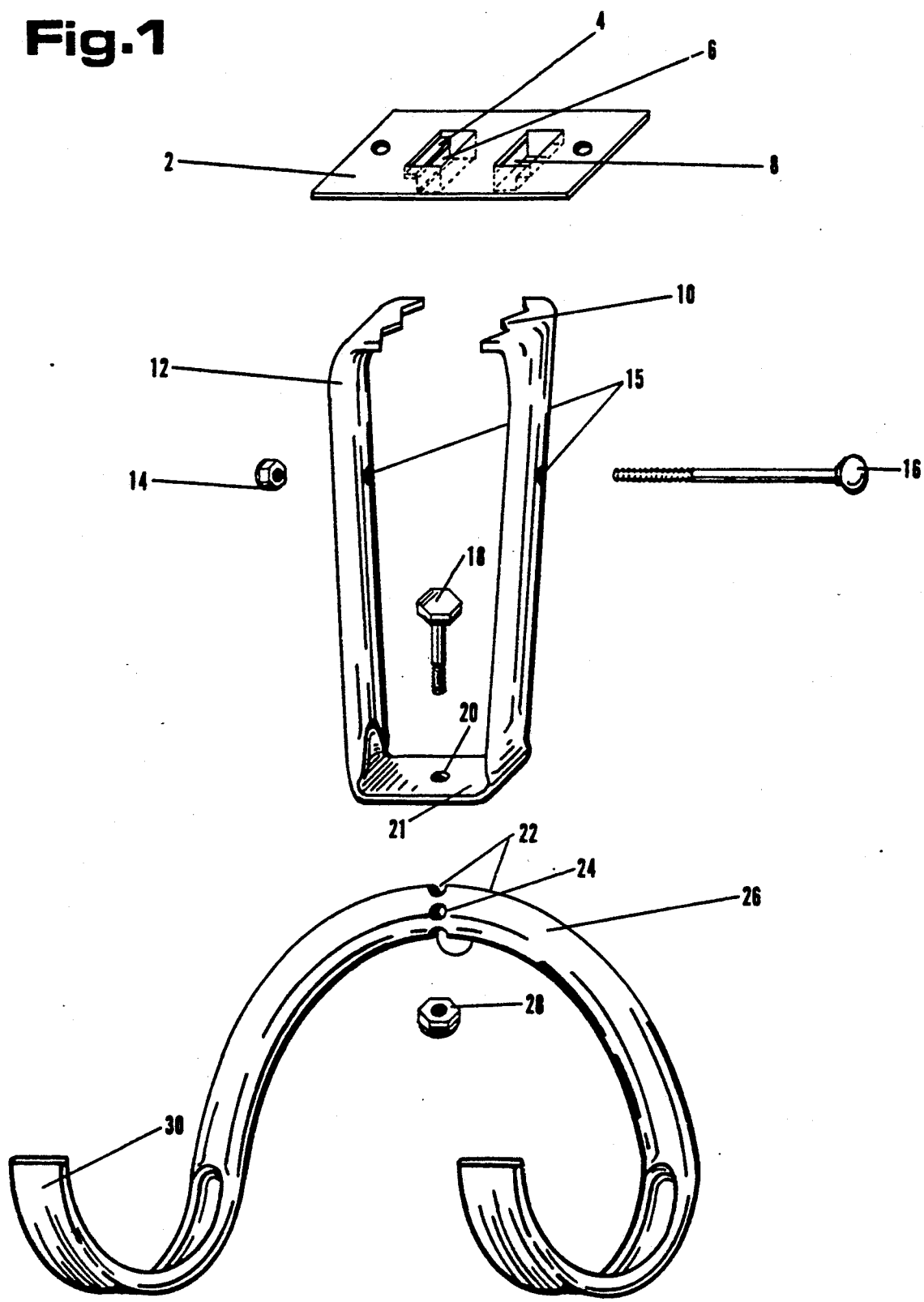
FIG. 1 is an exploded isometric view of the invention.

2 Flush surface mounting means
4 Shelf
6 Slot-front
8 Slot-rear
10 Gripping teeth
12 Clamping means
14 Self lock nut
15 Hole for 16
16 Clamp tightening bolt
18 Bolt to attach load restraining means 26
20 Hole for 18
21 Flattened central portion
22 Hole for 18
24 Alternative hole for 18
26 Load restraining means
28 Self lock nut
30 Load restraining member
32 Ceiling mounting means

DESCRIPTION OF INVENTION

Referring to the embodiment of this invention shown in FIG. 1. The load restraining means 26 is manufactured from a length of round metal tubing.

A length of tube is bent to a U shape, with legs of equal length. A certain length of tube at the end of each leg is bent to form a load restraining member 30.

The two load restraining members 30 align in a cooperative manner, whereby a bar may lie across the two, and be parallel to a tangent to the apex of the U.

There is a hole 22 at the apex of the U, transverse to the tubes axis, parallel to and in the same plane as the legs, and equidistant between the legs.

There is a hole 24 transverse to hole 22.

The clamping means 12 is manufactured from a length of round metal tubing.

A certain length of tube at each end is flattened, each end is in the same plane.

A certain length of tube equidistant from each end is flattened 21 in the same plane as the flattened ends. There is a hole 20 through the centre of the flat plane of this portion 21.

Each flattened end is cut to provide gripping teeth 10, in the same plane as which the ends are flattened.

Each flattened toothed end is bent into a common plane, a plane substantially perpendicular to the plane in which they were flattened.

Those portions of the tube extending each side of the flattened central portion 21 are bent into a common plane, a plane substantially perpendicular to the flat of the central portion 21, and where the gripping teeth 10 are toward each other.

Each of the legs thus established has a hole 15 through it. The holes are transverse to the legs axis, aligned and opposite each other. There is a bolt 16 through these holes 15.

A bolt 18 through hole 20 in the centre of the flat plane of the central portion 21, extends through the hole 22 in the apex of the load restraining means 26, joining the clamping means 12 to the load restraining means 26.

The flush surface mounting means 2 comprises a flat metal plate, with two four sided depressions centred in and square to the plates long axis. The depressions being outward from a flat surface upon which the plate may be mounted.

Those sides of the depressions which are farthest apart in the long axis originate in a shelf 4, then extend to contain slots 6 parallel to the plate.

Those sides of the depressions which are closest in the long axis, extend to contain slots 8 parallel to the plate.

Each slot is of a width and depth to admit the gripping teeth 10 of one leg of the clamping means 12.

There is a hole in each end of the plate, in the long axis and beyond each depression.

OPERATION

Where this invention is to be mounted to an exposed ceiling joist, the legs of the clamping means 12 straddle the width of the joist. Tightening the nut 14 to the bolt 16 which is through both legs, forcibly engages the gripping teeth 10 with the joist.

Where this invention is to be mounted to a flush ceiling surface with underlying joists, the flush surface mounting means 2 is secured with screws to one of the joists. The gripping teeth 10 of the clamping means 12 are entered into their respective opposite slots in the flush surface mounting means 2. Tightening the nut 14 to the bolt 16 which is through both legs secures the invention.

When the invention is secured in either manner of the above, the load restraining means 26 may be rotated in the horizantal plane to any desired position.

A mens style bicycle may be balancably suspended in storage, by entering the bicycle frame cross bar across both load restraining members 30.

A womens style bicycle may be balancably suspended in storage, when an alternative embodiment of the load restraining means 26 is employed. One whereby the load restraining members 30 extend to restrain the bicycle at points in the diagonal tubes of the bicycle frame.

An alternative embodiment wherein the load restraining means 26 is not intimate with the clamping means 12, but suspended therefrom with a longer connecting means than bolt 18, would be appropriate to the storage of bicycles with handlebars that extend upward, requiring extra clearance to the ceiling. Typically, childrens bicycles.

To hang an extension ladder in a flat relationship to a ceiling, a rung in the uppermost sliding member of the ladder would be entered across both load restraining members 30. The lower sliding member of the ladder would be extended to enter one of its rungs across the load restraining members 30 of another storage hanger, which may be lower than the first to keep the ladder level.

Figure 2:
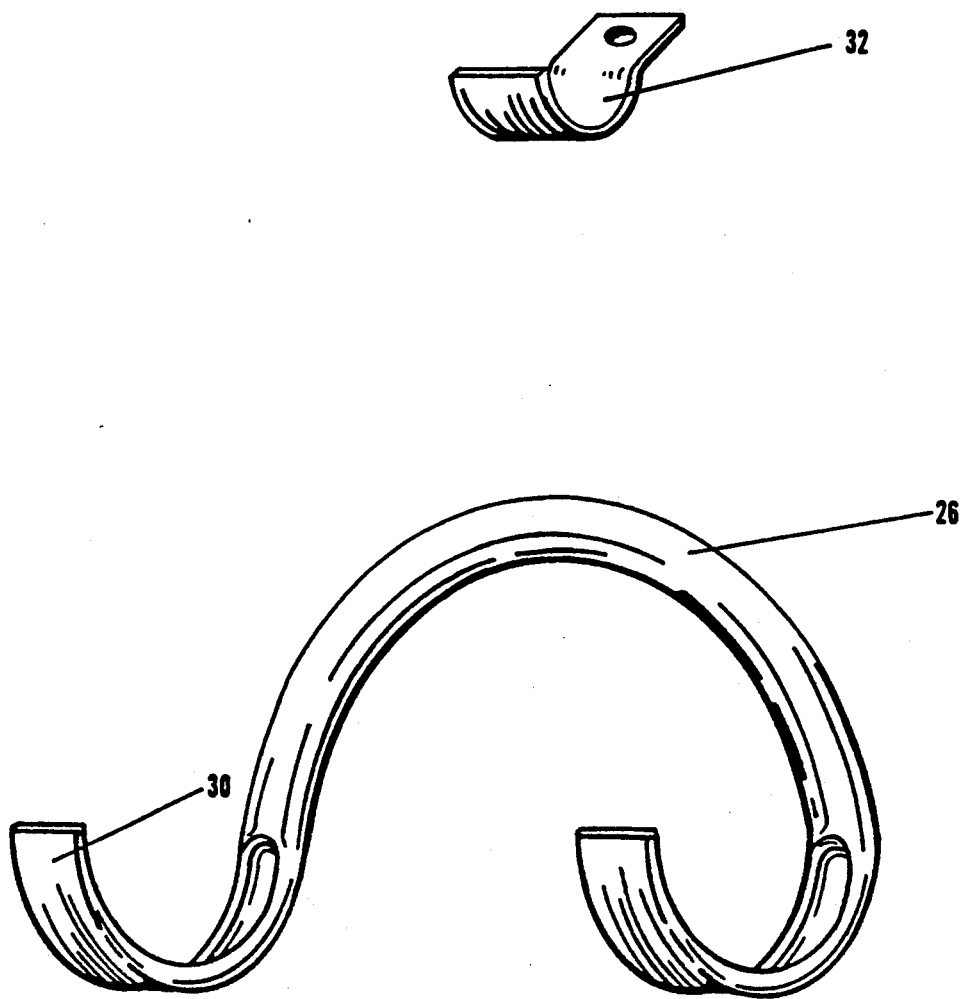
FIG. 2 is an exploded isometric view of an embodiment especially suited to the storage of ladders.

Referring to FIG. 2, an alternative ladder storage method is where two load restraining means 26 are mounted with a ceiling mounting means substantially as 32 whereby the load restraining means 26 is swingable in the long axis of a ladder suspended thereby.

The ladder is suspended by distantly separate rungs in the uppermost sliding member, respectively entered to the distantly mounted storage hangers. Any lack of coincidence between a rung and the necessarily joist mounted storage hanger is compensated for by the load restraining means 26 being swingable.

Where this invention is to be wall mounted, the flush surface mounting means 2 is secured with screws to a wall stud with the slotted depressions one above the other. The gripping teeth 10 of the clamping means 12 are entered into their respective opposite slots in the flush surface mounting means 2. Tightening the nut 14 to the bolt 16 which is through both legs secures the invention.

The load restraining means 26 must be at a right angle to the horizantal clamping means 12, secured to the clamping means 12 with bolt 18 through holes 20 and 24.

When wall mounted and suspending a load, the clamping means 12 is restrained from its tendency to droop from horizantal by bolt 16. This droop could be further addressed with a diagonal member secured between bolts 18 and 16.

While the above description contains many specificities, these should not be construed as limitations on the scope of the invention, but rather as an exemplification of one preferred embodiment thereof. Many variations are possible.

The load restraining means may be configured to suit various purposes such as balancably suspending garden rakes, shovels and like implements, suspending shelving. The clamping means may be of many known methods besides the bipedal type described.

Where the invention is used to store bicycles, there should be a non abrasive material on the load restraining members 30 to protect the bicycle.

Accordingly, the scope of the invention should be determined not by the embodiments described, but by the appended claims and their legal equivalents.

What I claim is:

1. A ceiling or wall mountable storage hanger comprising; a clamping means to mount the storage hanger, said clamping means having two elongate leg members of substantially equal length, in the same plane and laterally opposed, said elongate leg members having transversely opposite ends, one pair of said transversely opposite ends is hingably joined together, whereby the planar relationship between said leg members is variable from parallel to angular, the remote ends of said elongate leg members are adapted to engage and bite into the opposite lateral sides of an overhead, exposed wooden floor joist straddled thereby; a clamp tightening bolt which transversely connects said elongate leg members, in the portion of said clamping means which depends below said wooden floor joist; a load restraining means whereby the storage hanger can suspend a load, said load restraining means having substantially a plurality of hooks, similarly orientated, aligned and joined in a span, whereby a load placed thereaccross is restrained; a means whereby said load restraining means is attached to said clamping means, to depend vertically therefrom.

2. The apparatus of claim 1, having a flush surface mounting means, whereby the storage hanger can be mounted to a flush surface, said flush surface mounting means having one substantially flat surface area with screw holes, whereby it can be mounted to a flush surface, the outward facing portion of said flush surface mounting means is adapted so that the adapted remote leg ends of the clamping means can be securely clamped thereto, the load restraining means is variously attachable to said clamping means, whereby in wall mounting, when said clamping means extends horizontally outward, said load restraining means can be attached to depend vertically therefrom.

3. The apparatus of claim 1 wherein the suspended load restraining means is rotatable in the horizontal plane.

4. The apparatus of claim 2 wherein when ceiling mounted, the suspended load restraining means is rotatable in the horizontal plane.

* * * * *